(12) United States Patent
Jackson et al.

(10) Patent No.: US 7,961,395 B2
(45) Date of Patent: Jun. 14, 2011

(54) WIDEBAND DIFFRACTION LIMITED OPTICAL RECEIVER

(75) Inventors: John Edwin Jackson, Carol Streams, IL (US); Alan Richard Greenland, Palatine, IL (US); Christopher Brendan Svec, Palatine, IL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 357 days.

(21) Appl. No.: 11/778,886

(22) Filed: Jul. 17, 2007

(65) Prior Publication Data

US 2009/0021832 A1 Jan. 22, 2009

(51) Int. Cl.
*G02B 5/18* (2006.01)
(52) U.S. Cl. ........................ 359/570; 359/566
(58) Field of Classification Search .................. 359/566, 359/570
See application file for complete search history.

(56) References Cited

U.S. PATENT DOCUMENTS

| | | | | |
|---|---|---|---|---|
| 5,001,650 A | * | 3/1991 | Francis et al. | 348/169 |
| 5,044,706 A | * | 9/1991 | Chen | 359/357 |
| 5,127,728 A | * | 7/1992 | Warren et al. | 356/302 |
| 5,371,570 A | | 12/1994 | Morris et al. | |
| 5,973,827 A | * | 10/1999 | Chipper | 359/356 |
| 6,266,191 B1 | | 7/2001 | Abe | |
| 6,366,405 B2 | * | 4/2002 | Abe | 359/566 |
| 6,487,022 B1 | | 11/2002 | Okorogu | |
| 6,760,159 B2 | | 7/2004 | Nakai | |
| 6,999,243 B2 | * | 2/2006 | Chipper | 359/690 |
| 7,031,078 B2 | | 4/2006 | Ukuda | |

* cited by examiner

*Primary Examiner* — Joshua L Pritchett
(74) *Attorney, Agent, or Firm* — Tarolli, Sundheim, Covell & Tummino LLP

(57) ABSTRACT

Systems and methods are provided for providing wideband diffraction limited performance in an optical receiver. A first lens is constructed from a first material and has a first surface and a second surface. A second lens is constructed from a second material and having a first surface and a second surface. The second lens is positioned such that a first surface of the second lens faces a second surface of the first lens across a gap of air. A diffraction grating is applied to one of the first and second surfaces of the first and second lenses.

19 Claims, 4 Drawing Sheets

WIDEBAND DIFFRACTION LIMITED OPTICAL RECEIVER

TECHNICAL FIELD

The present invention relates generally to optics, and more particularly to a wideband diffraction limited optical receiver system.

BACKGROUND OF THE INVENTION

In some applications, it is important to achieve diffraction limited performance, that is performance at or near with the theoretical limits on the performance of an imaging system, over a relatively wide band of wavelengths. To achieve this performance, it is necessary to correct for disparities in the refractive properties of a system across various wavelengths comprising the wavelength band, such as chromatic aberrations. Over a narrow range of wavelengths, chromatic aberrations can be corrected through known methods, including careful selection of the material utilized in constructing the lenses within the receiver. In some wavelength bands, such as the near and mid-range infrared band, the available materials having the desired transmission properties are limited. As a result, diffraction limited performance has not previously been achieved for wideband applications within some wavelength bands, including the infrared band.

SUMMARY OF THE INVENTION

In accordance with an aspect of the present invention, a doublet lens assembly is provided. A first lens is constructed from a first material and has a first surface and a second surface. A second lens is constructed from a second material and having a first surface and a second surface. The second lens is positioned such that a first surface of the second lens faces a second surface of the first lens across a gap of air. A diffraction grating is applied to one of the first and second surfaces of the first and second lenses.

In accordance with another aspect of the present invention, a wideband diffraction limited receiver assembly is provided. A first doublet lens assembly focuses incident light. The first doublet lens assembly includes a first lens, made from a first material and having a first surface and a second surface, and a second lens, made from a second material and having a first surface and a second surface. The second lens is positioned such that a first surface of the second lens faces a second surface of the first lens across a gap of air. At least one of the first and second surfaces of the first and second lenses is an aspherical surface with a diffraction grating. A second doublet lens assembly receives light focused by the first doublet lens assembly and further focuses the received light. A focal plane array that receives light focused by the second doublet lens assembly and converts the received light to a digital image.

In accordance with yet another aspect of the present invention, a method is provided for constructing a doublet lens assembly that provides chromatic correction in an optical receiver system as to provide diffraction limited performance over a desired band of wavelengths. A first lens is constructed from a first material. A second lens is constructed from a second material. A diffraction grating is etched into a surface of one of the first lens and the second lens. The first lens and the second lens are positioned in a doublet lens arrangement with an air gap between the first lens and the second lens such that the etched surface containing the diffraction grating is adjacent to the air gap.

DETAILED DESCRIPTION OF INVENTION

Figure 1:
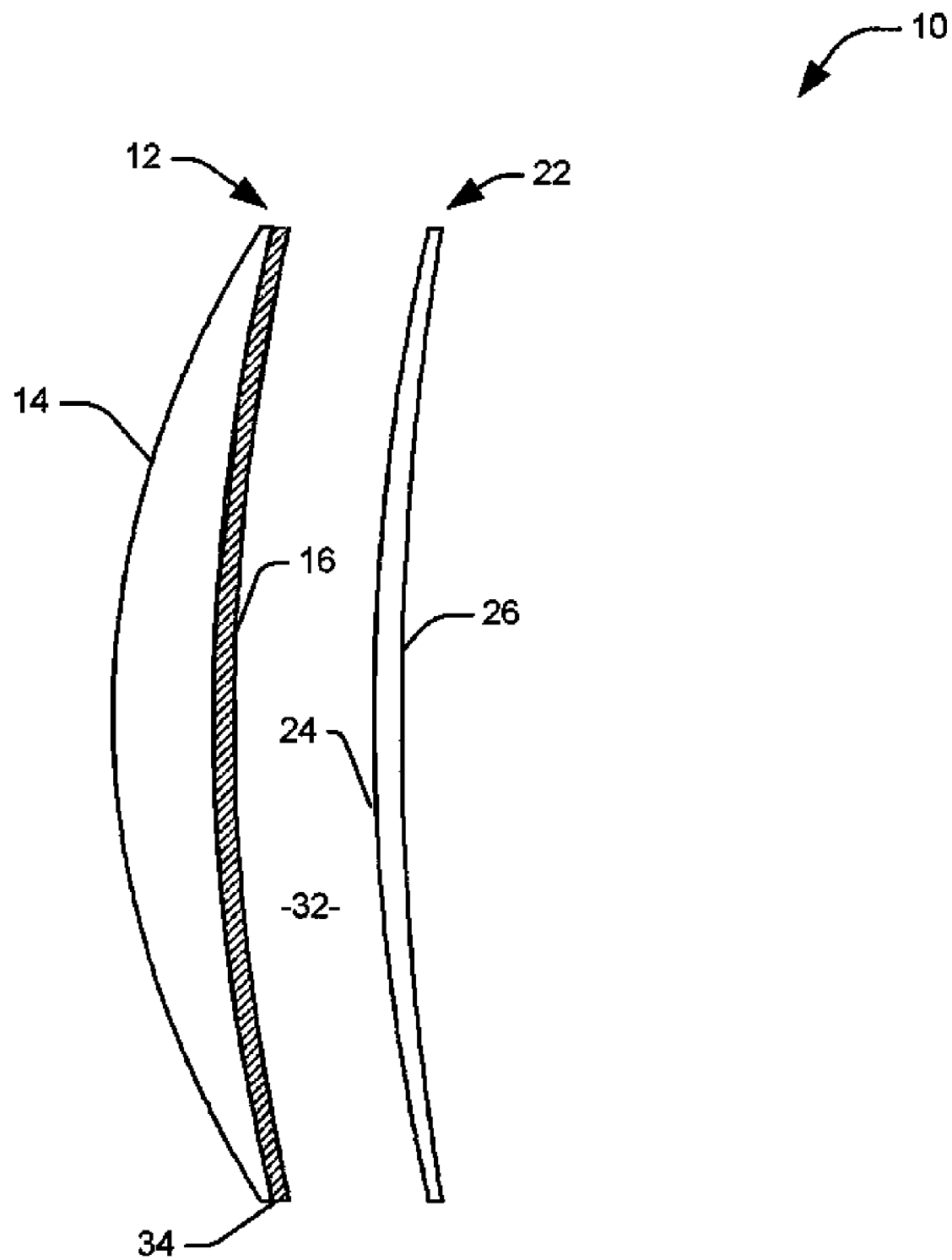
FIG. 1 provides a cross-sectional illustration of a doublet lens arrangement in accordance with an aspect of the present invention.

FIG. 1 provides a cross-sectional illustration of a doublet lens arrangement 10 in accordance with an aspect of the present invention. The doublet lens arrangement 10 is configured to collect light within a wavelength band of interest and provide a focused representation of the collected light to a desired location. A first lens 12, having a first surface 14 and a second surface 16, can be constructed from a first material, having desired dispersive properties over the wavelength band of interest. For example, the first material can be selected to have low dispersion, meaning that it has a relatively gradual variance in refractive index over the wavelength band of interest.

A second lens 22, having a first surface 24 and a second surface 26, can be constructed from a second material, having different dispersive properties over the wavelength band of interest than the first material. For example, the second material can be selected to have a relatively high dispersion, meaning that it has a rapid variance in refractive index over the wavelength band of interest. The dispersive properties of first and second materials can be selected to substantially negate one another over at least a portion of the wavelength band of interest such that the dispersive effect of the doublet on incident light is minimized. The second lens 22 can be positioned with its first surface 24 facing the second surface 16 of the first lens across a gap of air 32.

It will be appreciated, however, that there is a practical limit to the degree of chromatic correction that can be applied by a doublet using known materials. For a sufficiently large wavelength band of interest, the correction applied by the doublet may not be sufficient to correct the chromatic and achromatic aberrations within an optical system over a desired range of field angles. In accordance with an aspect of the present invention, a diffractive grating 34 can be applied to one or more surfaces (14, 16, 24, and 26) of the first and second lenses 12 and 14. For example, a diffractive grating 34 can comprise a number of concentric circular grooves etched onto the surface. In an exemplary implementation, these grooves can have a depth on the order of a few microns. The combined effect of the doublet 10 and the diffractive grating 34 can provide diffraction limited performance over a relatively wide band of wavelengths, for example, the near and mid-range infrared band of wavelengths.

In an exemplary implementation of the doublet 10, the diffractive grating 30 can be applied to an interior surface of the doublet (e.g., the second surface 16 of the first lens 12 or the first surface 24 of the second lens 22), such that the diffractive grating is adjacent to the air gap 32. This allows for an additional measure of protection for the diffractive grating 34, which can be relatively fragile. In addition, the surface (e.g., the second surface 16 of the first lens 12) bearing the diffractive grating 34 can be configured to be aspherical, allowing for additional fine tuning of the dispersive properties of the diffractive grating 34 and the lens (e.g., 12) associated with the diffractive grating. Accordingly, the doublet 10 can be designed to produce a substantially achromatic response over a wide wavelength band of interest.

In an aspect of the present invention, the first material is selected to have a relatively gradual variance in refractive index over a wavelength band of interest and positive optical power and the second material is selected to have a relatively rapid variance in refractive index over the wavelength band of interest and negative optical power, such that the dispersive properties of the lenses substantially cancel one another over the wavelength band of interest and a net positive optical power is achieved.

Figure 2:
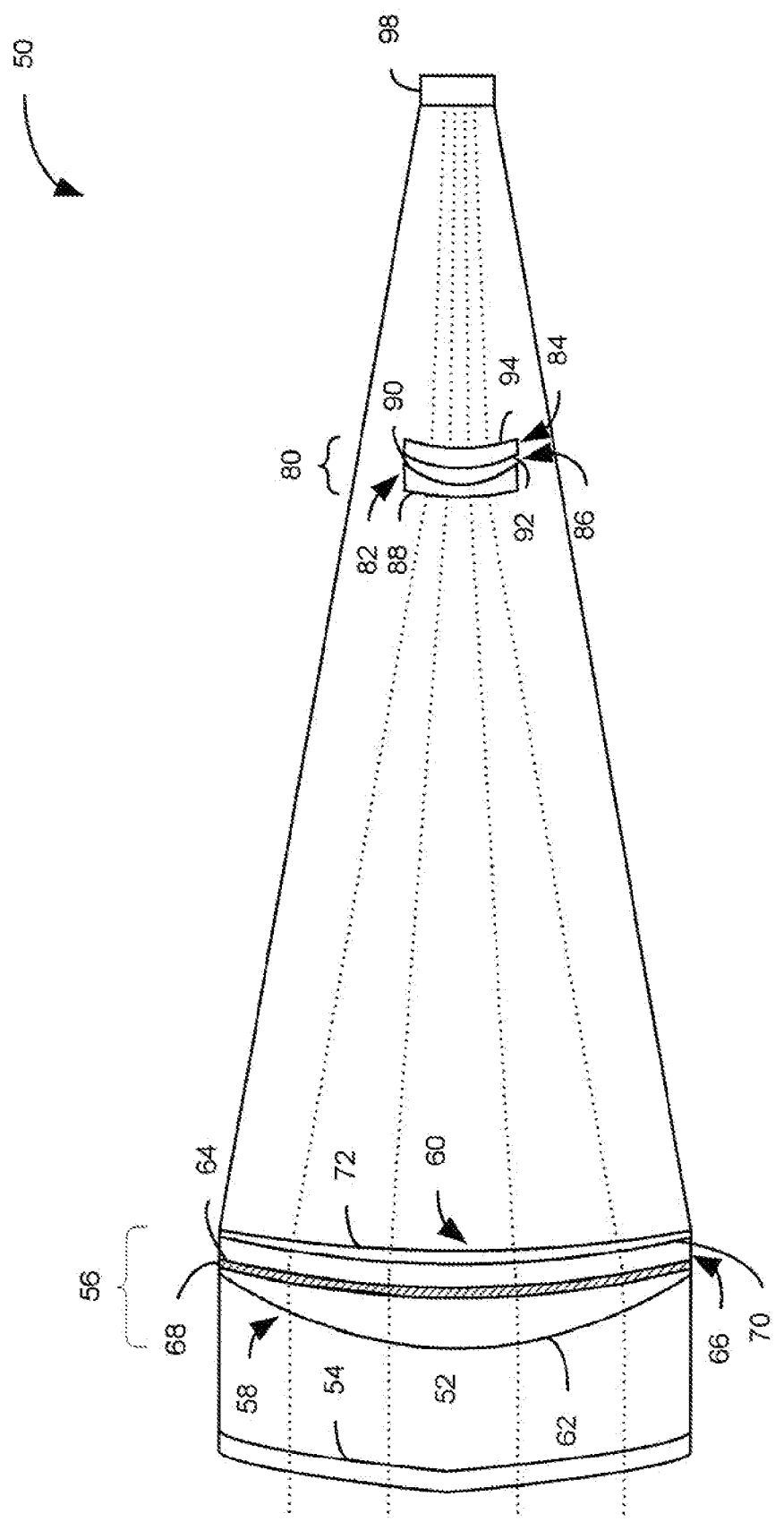
FIG. 2 illustrates an exemplary wideband diffraction limited receiver system in accordance with an aspect of the present invention.

FIG. 2 illustrates an exemplary wideband diffraction limited receiver system 50 in accordance with an aspect of the present invention. In the illustrated example, the receiver system 50 is configured to provide diffraction limited performance within at least the mid-wave infrared band (e.g., wavelengths of 3.4 micrometers to 5 micrometers). In the illustrated example, the receiver system 50 includes an aperture 52 of about six inches in diameter. The lenses comprising the system are about 1-10 millimeters in width. In practice, the materials comprising the lens are selected to transmit wavelengths from about 0.6 to about 10 micrometers with minimal chromatic aberration. A filter 54 can be positioned with the aperture 52 to attenuate light outside of this band of wavelengths. While the filter 54 is illustrated herein as free standing, the filter 54 can also comprise a coating on the exterior of a lens within the system 50.

The receiver system 50 comprises a first doublet lens arrangement 56 that collects incident light within a desired range of field angles (e.g., within one degree of a longitudinal axis of the receiver 50) at an aperture 52 associated with the receiver system 50. In accordance with an aspect of the present invention, the first doublet lens arrangement 56 comprises a first lens 58 constructed from a first material and a second lens 60 constructed from a second material. In the illustrated implementation, the first material is selected to have a relatively gradual variance in refractive index over the wavelength band of interest, and the second material is selected to have a relatively rapid variance in refractive index over the wavelength band of interest. For example, zinc selenide (ZnSe) can be used as the first material, and calcium fluoride (CaF$_2$) can be used as a second material. The first lens 58 has a first surface 62 that faces the aperture 52 and a second, aspherical surface 64 that faces the second lens 60 across an air gap 66. The second, aspherical surface 64 has an associated diffraction grating 66 that provides chromatic correction to light passing through the lens 58. The diffraction grating 68 can comprise a series of concentric circular grooves etched into the second surface 64 of the first lens 58. In the illustrated example, the grooves are several micrometers in depth.

The second lens 60 has a first surface 70 that faces the second surface 64 of the first lens 58 across the air gap 66 and a second surface 72. In the illustrated implementation, both the first surface 70 and the second surface 72 of the second lens 60 are spherical, that is, they are shaped like a section of the surface of a sphere. Light incident on the first doublet lens arrangement 56 exits the first doublet at the second surface 72 of the second lens 60 and is focused onto a second doublet lens arrangement 80. The second doublet lens arrangement 80 comprises a third lens 82 and a fourth lens 84. As in the first doublet, the third lens can be constructed from a material (e.g., ZnSe) selected to have a relatively gradual variance in refractive index over the wavelength band of interest, and the fourth lens can be constructed from a material (e.g., CaF$_2$) selected to have a relatively rapid variance in refractive index over the wavelength band of interest. In one implementation, the third lens is constructed from the first material and the fourth lens is constructed from the second material. In the illustrated implementation, the third and fourth lenses are separated by a second air gap 86, although it will be appreciated that the second doublet lens arrangement 80 can be constructed from two lenses cemented together without an air gap in some applications.

Light focused by the first doublet lens arrangement 56 is directed onto a first surface 88 of the third lens 82. A second surface 90 of the third lens 82 faces a first surface 92 of the fourth lens 84 across the second air gap 86. The directed light exits the second doublet lens arrangement 56 at a second surface 94 of the fourth lens 84 and is focused upon an image detector 98 (e.g., a focal plane array). In the illustrated implementation, each of the first and second surfaces 88 and 90 of the third lens 82 and the first and second surfaces 92 and 94 of the fourth lens 84 are spherical. The focal plane array 98 translates the focused light into a digital representation of the infrared image received at the aperture 54. This digital representation can be provided to any of a variety of image processing systems for analysis and display to an operator.

A optical prescription, describing an exemplary wideband diffraction limited receiver system in accordance with an aspect of the present invention in millimeter units, is provided below. The surfaces 62, 64, 70, 72, 88, 90, 92, and 94 of the lenses 58, 60, 82, and 84 are represented, in order from the aperture 52 to the focal plane array 98 as surfaces 2-9, and the focal plane is represented as surface 10. Surface 3 is aspherical, containing several distortions from an ideal spherical shape that can be represented as higher order terms (e.g., terms having a degree larger than two) in the polynomial describing the surface.

TABLE 1

| # | Type | Comment | Radius of Curvature | Thickness | Glass | Semi-Diameter | Conic |
|---|------|---------|---------------------|-----------|-------|---------------|-------|
| 0 | STANDARD | | | 1.00E+10 | | | |
| 1 | STANDARD | | | 25 | | 76.2 | |
| 2 | ASPHERICAL | 1$^{st}$ Lens, S1 | 192 | 11 | ZNSE | 76.5 | −0.296 |
| 3 | ASPHERICAL | 1$^{st}$ Lens, S2 | 471 | 1 | | 76.5 | |
| 4 | STANDARD | 2$^{nd}$ Lens, S1 | 503 | 3 | CAF2 | 75.8 | |
| 5 | STANDARD | 2$^{nd}$ Lens, S2 | 680 | 173 | | 75.4 | |
| 6 | STANDARD | 3$^{rd}$ Lens, S1 | 85.6 | 3.01 | ZNSE | 11.5 | |
| 7 | STANDARD | 3$^{rd}$ Lens, S2 | 27.1 | 1.40 | | 11.5 | |

TABLE 1-continued

| # | Type | Comment | Radius of Curvature | Thickness | Glass | Semi-Diameter | Conic |
|---|------|---------|---------------------|-----------|-------|---------------|-------|
| 8 | STANDARD | 4th Lens, S1 | 40.0 | 3.02 | CAF2 | 11.5 | |
| 9 | STANDARD | 4th Lens, S2 | 61.4 | 79.4 | | 11.5 | |
| 10 | STANDARD | FOCAL | 96.7 | | | 9.43 | |

Figure 3:
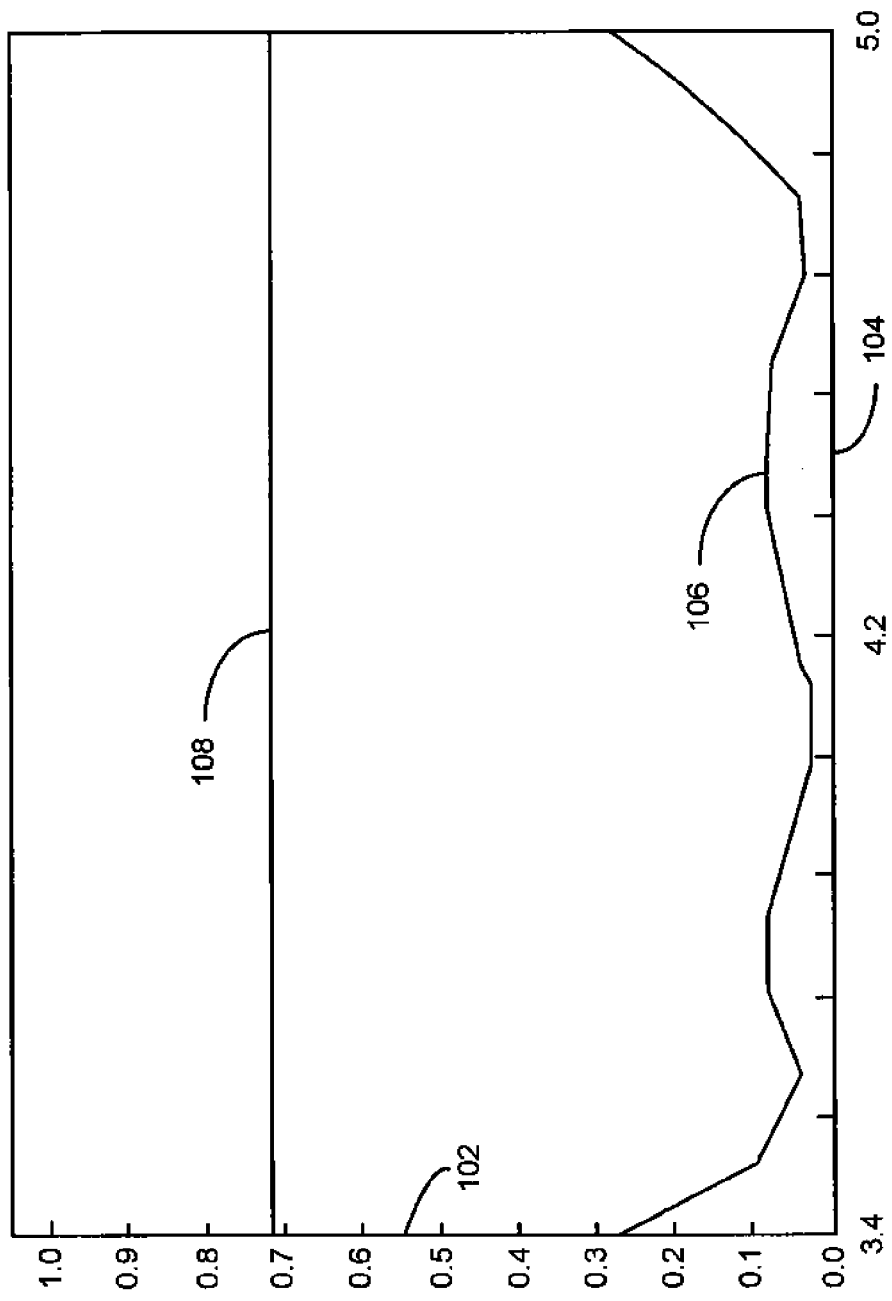
FIG. 3 is a chart illustrating the root mean square (RMS) refraction error expected due to aberration for a receiver system in accordance with an aspect of the present invention over an associated range of wavelengths.

FIG. 3 is a chart 100 illustrating the root mean square (RMS) wavefront error expected due to aberrations over an associated range of wavelengths for a receiver system in accordance with an aspect of the present invention. The vertical axis 102 of the chart 100 represents the RMS wavefront error expected by the receiver, measured in fractions of a wavelength. The horizontal axis 104 of the chart 100 represents the wavelength of light incident to the receiver system, measured in micrometers. The performance of the receiver system 106 is illustrated in comparison to a diffraction limit 108 that represents the theoretical minimum refraction error associated with the system based upon the size of a receiver aperture and the wavelength of the incident light. As can be seen, the expected RMS error due to aberrations from the receiver system falls well below the diffraction limit for all wavelengths within the band, hence the amount of chromatic aberration within this band of wavelengths is very small.

Figure 4:
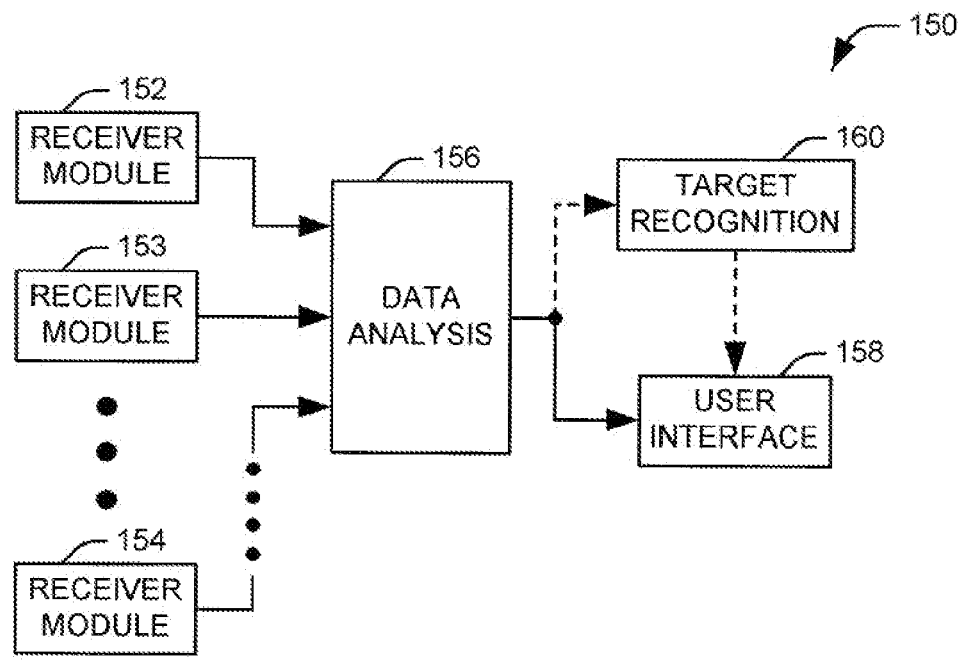
FIG. 4 illustrates an exemplary forward looking infrared sensor system utilizing a plurality of wideband diffraction limited receivers in accordance with an aspect of the present invention.

FIG. 4 illustrates an exemplary forward looking infrared sensor system 150 utilizing a plurality of wideband diffraction limited receivers 152-154 in accordance with an aspect of the present invention. The illustrated system 150 can be used for any of a number of applications in which it is desirable to track sources of infrared radiation. For example, the system 150 can be mounted on or in a mobile platform (e.g., aircraft, spacecraft, watercraft, or ground vehicle) or a stationary monitoring station as part of a battlefield monitoring system.

The illustrated system 150 monitors a region of space for sources of infrared radiation. To this end, the plurality of receivers 152-154 can be arranged such that the field of view associated with each receiver covers a discrete area of the monitored region with minimal overlap. The output of each of the plurality of receivers 152-154 is provided to data analysis component 156 that reconciles the data provided by the plurality of receivers 152-154 to provide a coherent image of infrared sources in the monitored region. It will be appreciated that the data analysis component 156 can be implemented as a software program, as dedicated hardware, or as a combination of the two. A variety of data analysis algorithms and processes are available for this purpose. The image generated by the data analysis component 156 can be provided to an associated user interface 158 for display to a user.

In an exemplary implementation of the present invention, the infrared image generated at the data analysis component 156 can be provided to a target recognition component 160. The target recognition component 160 identifies portions of the infrared image containing potential targets and provides the identified portions to one or more expert systems that categorize the contents of the identified portions of the infrared image. For example, the target recognition system 160 can comprise a feature extractor that reduces the identified image portions to numerical vectors representing image features useful for classification and one or more classification systems that classify the potential targets as one of a target, a non-target, or a specific category of target. This classification can be displayed to the user, along with the infrared image, at the user interface.

Figure 5:
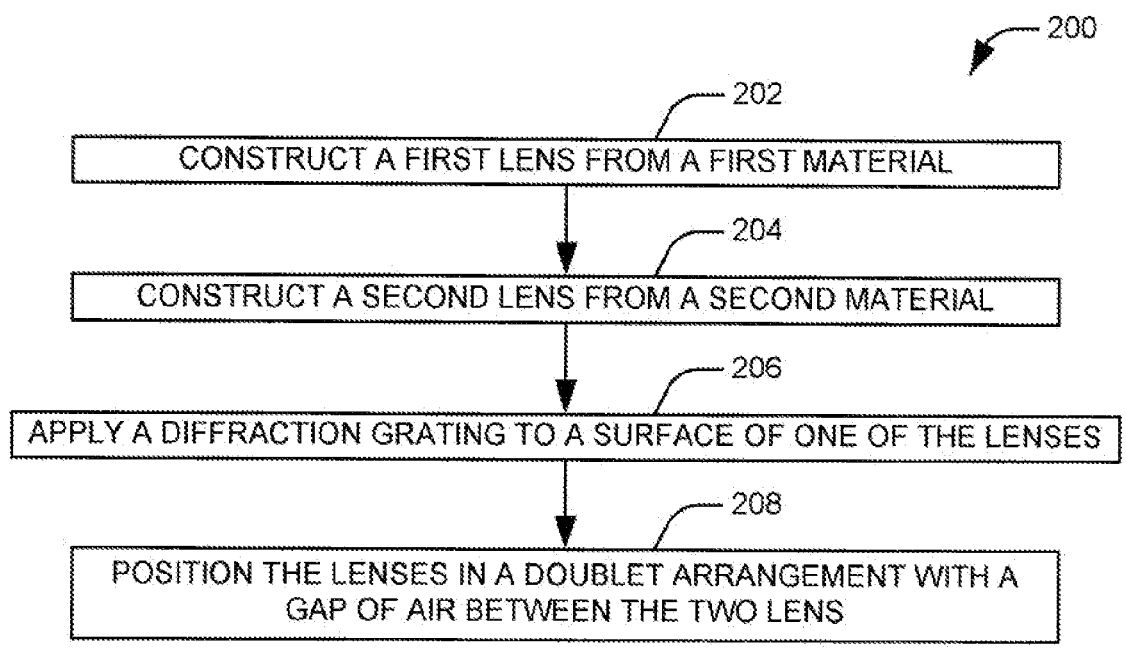
FIG. 5 illustrates an exemplary methodology for constructing a doublet lens assembly in accordance with an aspect of the present invention.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an exemplary methodology 200 for constructing a doublet lens assembly in accordance with an aspect of the present invention. At 202, a first lens, designed to have positive optical power, is constructed from a first material. The first material can be selected to have an index of refraction that is relatively invariant to changes in wavelength. At 204, a second lens, designed to have negative optical power, is constructed from a second material. The second material can be selected to have an index of refraction that is relatively sensitive to changes in wavelength.

At 206, a diffraction grating is etched into a surface of either the first or second lens. In an exemplary implementation, the diffraction grating is applied to a surface of its associated lens that will face the other lens in the doublet lens assembly as to provide some protection to the grating. At 208, the lenses are positioned in a doublet arrangement, with an air gap between the first lens and the second lens. For example, the leases can be held in position by an exterior housing. In one implementation, the air gap between the lenses is equal to or less than the width of the lenses. When the lenses are positioned in the doublet arrangement, the lenses are designed such that the dispersive properties of the lenses substantially cancel one another over the wavelength band of interest and a net positive optical power is achieved by the doublet.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:
1. A doublet lens assembly comprising:
  a first lens made from a first material and having a first surface and a second, aspherical, surface;
  a second lens made from a second material and having a first surface and a second surface, the second lens being positioned such that a first surface of the second lens faces a second surface of the first lens across a gap of air, the second lens being a meniscus lens and the width of the gap of air along an axis of the doublet lens assembly being less than a width of the first lens along the axis; and a diffraction grating applied to one of the first and second surfaces of one of the first and second lenses.

2. The assembly of claim 1, the diffraction grating being applied to one of the first and second surfaces of one of the first and second lenses, such that the diffraction grating is adjacent to the gap of air.

3. The assembly of claim 1, the first material being selected to have a relatively gradual variance in refractive index over a wavelength band of interest and positive optical power and the second material being selected to have a relatively rapid variance in refractive index over the wavelength band of interest and negative optical power, such that the dispersive properties of the lenses substantially cancel one another over the wavelength band of interest and a net positive optical power is achieved.

4. The assembly of claim 1, the first material and the second material being operative to transmit light having a wavelength between about 0.6 micrometers and about 10 micrometers.

5. The assembly of claim 1, wherein the diffraction grating comprises a series of concentric circular grooves etched onto one of the first and second surfaces of the first and second lenses.

6. A wideband diffraction limited receiver assembly, comprising:
the doublet lens assembly of claim 1;
a second doublet lens assembly that receives light focused by the doublet lens assembly; and
a focal plane array that receives light focused by the second doublet lens assembly and converts the received light to a digital image.

7. A forward looking sensor system, comprising:
a plurality of wideband diffraction limited receiver assemblies as set forth in claim 6;
a data analysis component that reconciles data provided from the plurality of wideband diffraction limited receiver assemblies to provide a sensor image; and
a user interface that displays the sensor image.

8. A wideband diffraction limited receiver assembly that provides diffraction limited performance over a desired wavelength band, comprising:
a first doublet lens assembly that focuses incident light, comprising;
a first lens made from a first material and having a first surface and a second surface;
a second lens made from a second material and having a first surface and a second surface, the second lens being positioned such that a first surface of the second lens faces a second surface of the first lens across a gap of air having a width less than an associated width of at least one of the first lens and the second lens; and
wherein at least one of the first and second surfaces of the first and second lenses is an aspherical surface with a diffraction grating;
a second doublet lens assembly that receives light focused by the first doublet lens assembly and further focuses the received light; and
an image detector that receives light focused by the second doublet lens assembly and converts the received light to a digital image.

9. The assembly of claim 8, further comprising a filter that attenuates incident light having wavelengths outside of the desired wavelength band.

10. The assembly of claim 8, wherein the diffraction grating is applied to at least one of the second surface of the first lens and the first surface of the second lens.

11. The assembly of claim 8, where the desired wavelength band includes the near and mid-range infrared wavelength bands.

12. The assembly of claim 8, wherein the second doublet lens assembly comprises a third lens, constructed from the first material, and a fourth lens, constructed from the second material.

13. A forward looking sensor system, comprising:
a plurality of wideband diffraction limited receiver assemblies as set forth in claim 8;
a data analysis component that reconciles data provided from the plurality of wideband diffraction limited receiver assemblies to provide a sensor image; and
a user interface that displays the sensor image.

14. The system of claim 13, further comprising a target recognition component that identifies portions of the sensor image containing potential targets and categorizes the identified sensor image portions as targets or non-targets.

15. The assembly of claim 8, the first material being selected to have a relatively gradual variance in refractive index over a wavelength band of interest and positive optical power and the second material being selected to have a relatively rapid variance in refractive index over the wavelength band of interest and negative optical power, such that the dispersive properties of the lenses substantially cancel one another over the wavelength band of interest and a net positive optical power is achieved.

16. A method for constructing a doublet lens assembly that provides chromatic correction in an optical receiver system as to provide diffraction limited performance over a desired band of wavelengths comprising:
constructing a first lens from a first material, such that the first lens has at least one aspherical surface and an associated width;
constructing a second, meniscus, lens from a second material;
etching a diffraction grating onto a surface of one of the first lens and the second lens; and
positioning the first lens and the second lens in a doublet lens arrangement with an air gap between the first lens and the second lens such that the etched surface containing the diffraction grating is adjacent to the air gap, the width of the gap of air along an axis of the doublet lens assembly being less than the width of the first lens.

17. The method of claim 16, wherein etching a diffraction grating comprises etching the diffraction grating onto the aspherical surface.

18. The method of claim 16, where the first material is zinc selenide and the second material is calcium fluoride.

19. The method of claim 16, the first material being selected to have a relatively gradual variance in refractive index over a wavelength band of interest and positive optical power and the second material being selected to have a relatively rapid variance in refractive index over the wavelength band of interest and negative optical power, such that the dispersive properties of the lenses substantially cancel one another over the wavelength band of interest and a net positive optical power is achieved.

* * * * *